April 26, 1960 W. H. MEEKER 2,933,795
SAFETY BELT BUCKLE
Filed Oct. 19, 1955
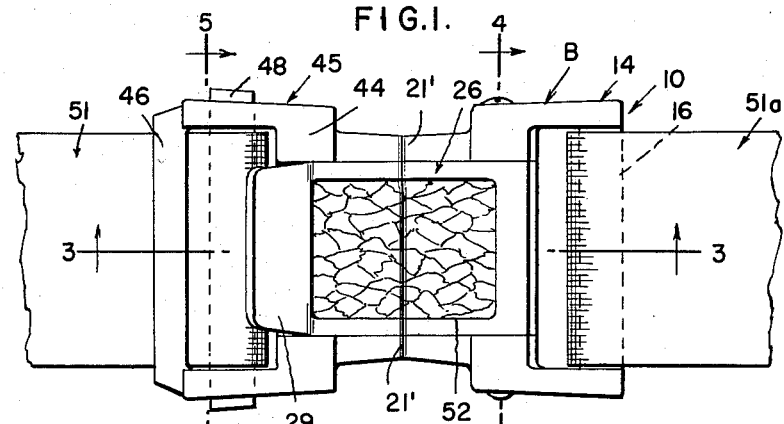
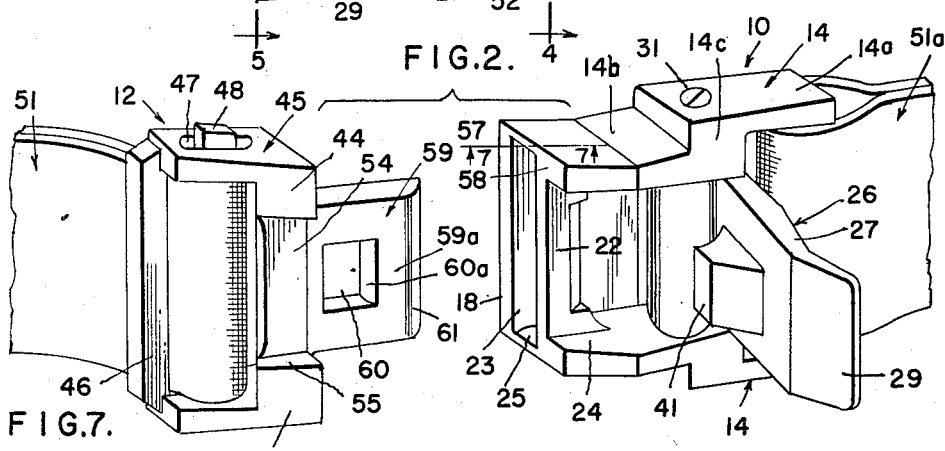
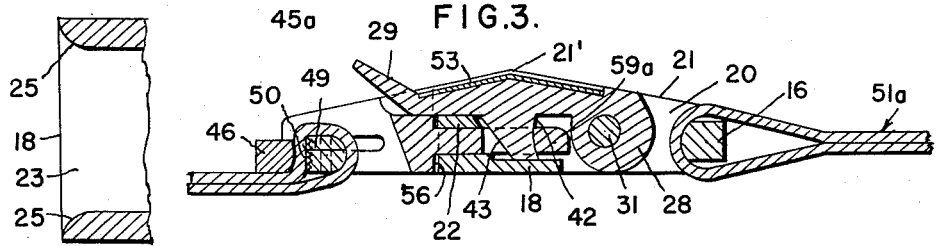
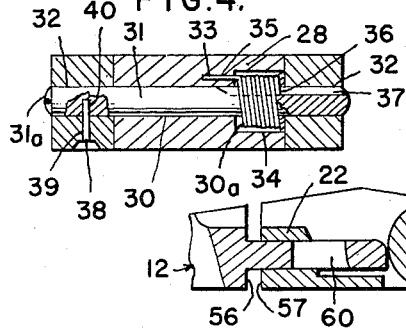
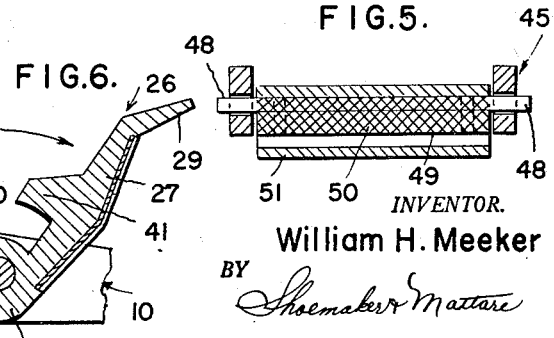
INVENTOR.
William H. Meeker
BY
Shoemaker & Mattare
ATTYS.

United States Patent Office 2,933,795
Patented Apr. 26, 1960

2,933,795

SAFETY BELT BUCKLE

William H. Meeker, Rochester, N.Y., assignor to Hickok Manufacturing Co. Inc., Rochester, N.Y., a corporation of New York Application October 19, 1955, Serial No. 541,412

8 Claims. (Cl. 24—230)

This invention relates generally to improvements in belt buckles and is directed particularly to a new buckle designed primarily for use in connection with or on safety belts.

Because of the rapid increase in vehicular accidents, a great deal of study has been and is being given to ways and means of reducing injuries and fatalities associated therewith and considerable attention is directed particularly to the provision of satisfactory means of holding occupants from being catapulted from their seats when a collision occurs. These studies have shown that a high percentage of injuries and deaths occur as a result of the vehicle occupants being thrown upwardly and forwardly from their seats and either striking their heads on the roof of the vehicle or being thrown forward and striking the windshield or instrument panel, or in some cases, it has been determined that the occupant both strikes the roof and then the windshield or instrument panel.

In view of the foregoing, it is a particular object of the present invention to provide, in a manner as hereinafter set forth a new buckle structure for a safety belt attached to a motor vehicle or aircraft seat, which buckle will withstand intense strain without breaking or coming open and at the same time, if necessity requires, may be easily opened or unfastened to release the person about whom the belt passes.

In the use of safety belts in connection with motor vehicle or aircraft seats, it is also desirable and important that the belt buckle not only be of sufficient strength to take heavy strains but that it be of a character to enable the user to fasten it easily, by feel alone if necessary, and unfasten it with a minimum of effort.

In the light of the foregoing, it is accordingly another object of the invention to provide a new form of belt buckle for the use stated, which can be fastened by the simple action of pressing two parts thereof together and which can be released or unfastened by one movement of the hand with respect to one part of the buckle.

Another object of the invention is to provide, in the manner as hereinafter set forth, a belt buckle embodying a keeper part and a secured part in which portions of the two parts are telescopically related and wherein one of the said parts embodies a shiftable or movable detent, while the other part in the telescoped portion thereof is formed to be engaged by the detent, the detent being of novel character whereby it will automatically connect with the said formed part when the telescopic relationship of the coacting elements of the two belt parts is established.

Still another object of the invention is to provide a buckle structure of the character above defined wherein the detent is carried upon a pivoted face plate, which plate is formed or constructed to be easily and quickly grasped or engaged by the fingers of one hand and moved by the one hand to a position to disengage the detent from the portion of the one part with which it is connected so that the two parts of the buckle can be separated without difficulty when the belt connected to the buckle is under tension.

A further object of the invention is to provide in a belt buckle of the character stated a construction wherein the portion of the part secured by the detent is apertured to receive the detent and the detent is designed or shaped for engagement in such aperture in such a manner as to eliminate looseness or play between the joined parts of the belt without at the same time causing binding or tightness which might interfere with or delay the separation of the buckle parts in the event of it becoming necessary to release the buckle quickly.

Another object of the invention is to provide a buckle of the character stated having a construction wherein means is provided for starting the separatory movement of the telescopically related or engaged portions of the buckle parts as soon as the detent has cleared the opening in which it is engaged.

A still further object of the invention is to provide a safety belt buckle wherein an element of one of two parts is insertable into the other part for fastening the two parts together and wherein the inversion of the inserted element of the one part of the buckle relative to the other will not interfere with or prevent the desired coupling of the parts together.

A further object is to provide in a belt buckle of the character stated a new and novel means for attaching the belt to one of the two parts thereof whereby to facilitate the adjustment of the length or size of the belt.

The invention will be best understood from a consideration of the following detailed description taken in connection with the accompanying drawing forming a part of the specification with the understanding, however, that the invention is not confined to a strict conformity with the showing of the drawing but may be changed or modified so long as such changes or modifications mark no material departure from the salient features of the invention as expressed in the appended claims.

In the drawing:

Fig. 1 is a view in front elevation of a buckle constructed in accordance with the preferred embodiment of the present invention showing the two parts thereof coupled together and with a portion of a belt attached to each part.

Fig. 2 is a perspective exploded view of the buckle showing the detent carrying face plate drawn back or opened as it would be in effecting the detachment of one of the parts from the other.

Fig. 3 is a longitudinal section taken substantially on the line 3—3 of Fig. 1.

Fig. 4 is a transverse section taken substantially on the line 4—4 of Fig. 1 with portions of certain of the elements in elevation.

Fig. 5 is a sectional view taken substantially on the line 5—5 of Fig. 1.

Fig. 6 is a fragmentary detail section illustrating the camming action produced in connection with the opening of the detent carrying face plate.

Fig. 7 is a fragmentary detail section taken substantially on the line 7—7 of Fig. 2.

Referring now more particularly to the drawing, it will be seen that the belt buckle of the present invention, which is generally designated B comprises two main parts which are the part 10 to be referred to or identified as the keeper part and the part 12 to be referred to or identified as the secured part. These two parts of the buckle are constructed in such a manner, as will be hereinafter specifically described, that when they are brought into end-to-end relation they will be automatically coupled together.

The buckle as a whole is relatively long and substantially flat and the keeper part 10 thereof comprises two long side wall portions 14 which are connected together at the outer end of such part by a fixed cross bar 16. At the opposite or inner ends of the side wall portions 14, there is the transverse back plate 18 which is in spaced relation with the bar 16, thus forming a transverse opening through the keeper part as is clearly shown in Fig. 3 and which opening is designated 20.

The back edges of the side wall parts 14 are flat and in a common plane with the rear or back side of the plate 18 as shown in Fig. 3, while the forward or front faces of the side wall portions are inclined or sloping as indicated at 21 and rise from a minimum height from the side portions 14 at the outer ends to a maximum height or peak in the form of a transverse ridge 21', which ridge is located approximately midway between the ends of the complete buckle structure as is clearly shown in Fig. 1.

As is clearly shown in Fig. 2, the side wall portions 14 of the keeper part 10 are spaced apart at the outer ends through approximately half their lengths as at 14a, a slightly greater distance than the inner half portions thereof which are designated 14b and the walls are of substantially increased thickness transversely in the central or intermediate portions where the outer and inner sections 14a and 14b join, as indicated at 14c.

The back plate 18 is of a length approximately equal to the length of the inner wall portions 14b between which it extends and at the inner ends of the walls 14 the portions 14b are connected by a cross bar 22 which is in spaced relation with the back plate 18 and forms therewith the entrance slot 23 in which a portion of the secured part 12 positions when the two parts of the buckle are coupled together. This bar 22 is located between the back plate 18 and the top or forward faces of the side wall portions 14 so that each of the portions 14b has an inner face or shoulder 24 between which shoulders the hereinafter described detent carrying plate positions when the buckle is fastened.

Between the back plate 18 and the bar 22 the inner faces of the portions 14b are beveled outwardly at the sides of the entrance slot 23 as indicated at 25.

The numeral 26 generally designates a movable face plate which comprises a flat body portion 27, an inner end barrel 28 and an outer angularly directed or obliquely extending tongue 29. The barrel portion 28 has an eccentric passage 30 extending longitudinally therethrough and this barrel portion fits snugly between the opposed inner surfaces of the portions 14c and has extended therethrough the pivot pin 31. As shown in Fig. 4, this pivot pin 31 extends at its ends through openings 32 formed transversely through the portions 14c of the walls 14.

One end of the passage is of enlarged diameter as indicated at 30a and at the inner end of this enlarged portion the barrel is provided with a small longitudinally directed bore 33 for the purpose about to be described. The enlarged portion 30a of the passage 30 forms a chamber in which is housed the coil spring 34, which spring encircles the pivot pin 31 as shown in Fig. 4 and one end of the spring extends longitudinally of the pivot pin as indicated at 35 and is engaged in the bore 33, while the opposite end of the spring is turned inwardly as indicated at 36 and engages in a longitudinally extending groove 37 in the surface of the pin 31.

One end of the pin 31 is formed with a slot or kerf 31a to receive a screwdriver or other implement by which to rotate the pin in the proper direction to place the coil spring under tension and when the required tension is obtained a lock pin 38 is extended through a bore 39 formed in the adjacent portion 14c from the back of the wall and engaged in a receiving socket 40 formed in the pin 31.

The tension of the spring is such as to normally urge the plate 26 to a closed position, by which is meant a position where it lies between the wall faces 24 and rests upon the bar 22 as illustrated in Fig. 3. When in this closed position, the angular terminal portion 29 of the plate body 27 extends upwardly and outwardly with respect to the outer side of the buckle as is also shown in Fig. 3 so that it is in a convenient position to be engaged by the fingers when it is desired to swing the plate outwardly for the purpose of opening the buckle.

The plate body 27 carries upon the under face, the dog or detent 41 which, when the plate is in closed position, projects into the space between the bar 22 and the barrel portion 28 and comes into close proximity with the inner face of the back wall 18.

The detent 41 on the side nearest the barrel 28 is transversely curved or arcuate as indicated at 42, while the opposite side or face is inclined or sloped to form an obtuse angle with the inner side of the plate body 27 as indicated at 43. This inclined face of the detent functions as a cam in the manner hereinafter described, in connection with the fastening of the buckle.

The curvature of the opposite face of the detent is struck approximately from the center of the pivot pin 31.

The secured part 12 of the buckle embodies a relatively heavy bar body 44 which, at its opposite ends, joins the side wall portions each of which is generally designated 45 and which portions are joined at their outer ends by the integral transverse bar 46 which is in parallel relation with the bar body 44. Each of the two wall portions 45 has a longitudinal slot 47 therein and slidably engaged in these slots are the flattened end portions 48 of a cinch bar 49 which extends across between the wall portions 45 in the space between the bar body 44 and the outer bar 46. This cinch bar 49 has a roughened or toothed face 50 which opposes the adjacent side of the bar 46 with which it cooperates for securing an end of a belt section which is generally designated 51.

The wall portions 45 have their top surfaces 45a, in the design of the buckle here disclosed, inclined as illustrated in Fig. 3 so as to conform to the inclination of the portion of the surface 21 of the keeper part on the side of the ridge 21' opposite from the bar 16. Also it will be seen particularly upon reference to Figs. 3 and 6, that the body 27 of the plate 26 is of major thickness approximately midway between its ends and slopes outwardly from the transverse center to conform in outer surface contour with the inclined surfaces 21 and 45a. Thus it will be seen that in this design the central transverse ridge of the buckle extends transversely of the center part of the buckle.

Also the outer side of the plate 26 is preferably recessed as indicated at 52 to receive an ornamental insert of desired character such as a relatively thin body of leather 53 which may be of any desired color or have any desired surface ornamentation.

While in the foregoing the description has outlined a buckle having an outer side which is formed with a central transverse rib and slopes outwardly in the two directions from this rib, it is to be understood that the invention is not limited to this specific design form and neither is the invention limited to the specific form of ornamentation shown and described as it will be readily obvious that other designs or ornaments may be fixed to the outer side of the plate body 27.

The bar body 44 on its outer side is recessed through the major portion of its length as indicated at 54. The width of this recess is such as to snugly receive the flanged end portion of the plate body 27 when the latter is in closed position as illustrated in Fig. 3, at which time the plate body rests upon the surface of the bar body 44 between the two opposed recess walls 55.

The bar body 44 has a flat face 56 which, when the buckle parts are in joined or coupled relation, is positioned against the flat face 57 of the keeper part, which flat face embodies each surface of the back plate 18, the bar 22 and the side wall portions 14b.

Formed integral with the face 56 of the secured part is a tongue 59 which is here illustrated as being flat and relatively thin and of a width to enter the slot 23 of the keeper part between the plate 18 and the bar 22. This tongue 59 is provided with detent receiving opening 60 which is shown as being rectangular. The cross section of the detent 41 is of the same rectangular form and dimensioned to enter and fit relatively snugly in this tongue opening 60. The outer or advancing edge of the tongue 59 has a rounded top corner 61 which, when the tongue is introduced into the receiving slot 23, contacts the camming face 43 of the detent 41 and swings the plate 26 against the resistance of the spring 34 so as to let the tongue pass beneath the detent. After the opening 60 of the tongue is in proper position, it will be seen that the detent 41 under the urge of the spring 34 actuating the plate 26 will snap into the opening and at this time the portion 59a of the tongue 59 will be between the curved face 42 of the detent and the barrel 28 and the wall of the opening 60, at the inner side of this portion 59a is transversely curved as at 60a to substantially correspond to the curvature 42 of the detent.

When the buckle is closed or, in other words, when the two parts 10 and 12 are in assembled relation, the tongue part 59a will be snugly held between the curved face 42 of the detent and the barrel 28 of the plate body 27.

As hereinbefore stated, the barrel 28 is eccentrically mounted on the pin 31 and when the two parts of the buckle are assembled as shown in Fig. 3, the high point of the cam which the barrel thus forms is away from or remote from the tongue portion 59a but it will be seen upon reference to Fig. 6 that when the plate 26 is swung outwardly to release the part 12, the high side of the barrel cam will swing around against the tongue to apply moving pressure thereagainst. This action occurs as soon as the detent 41 clears the opening 60. This construction will make apparent that, when the belt is to be released only a slight outward swinging of the release plate 26 and the detent 41 is required to disengage the tongue and if there should be any slight binding between the tongue and the sides of the slot, the camming action of the barrel 28 will assist in the separatory movement of the parts.

As soon as the parts are separated and the actuating plate 26 is released, the spring 34 will return the plate to closed position and reconnection or re-fastening of the buckle is then easily accomplished merely by thrusting the tongue 59 into the slot 23, which action will move the detent as previously described to permit the tongue opening to come into the proper position to receive the detent.

It will also be apparent that with the construction shown, if by any chance the tongue 59 should be inserted in the reversed or up-side-down position, it will still actuate the detent and plate and engagement between the parts will be effected.

In the use of buckles of the character here described, it is, of course, well known that the strap which would be attached to a vehicle seat is in two parts and one of these parts which is designated 51 is adjustably connected to the buckle by means of the cinch bar 49, while the other strap part which is designated 51a may be permanently secured by a loop through which the bar 16 of the keeper part extends as shown in Fig. 3.

The material for the belt or belt parts 51 and 51a may be, for esthetic value, of a desired attractive color or weave and the ornamentation in the form of the insert 53 may be of similar material or of leather or any other material colored or designed to go with the design and color of the belt.

I claim:

1. A safety belt buckle comprising two cooperating fully separable parts, the buckle having two outer end portions, a front and a back side, means at each of said outer end portions for attaching a belt end thereto, each of said parts embodying one of said end portions, said parts having opposing abutting end faces, a tongue projecting from the end face of one of said parts, the other of said parts having a slot opening through the end face thereof into which said tongue is received in fastening the buckle, the slot having four sides for snugly embracing corresponding sides of the tongue, a part of said slot opening through the front side of the said other part, a release plate pivoted to and forming a part of the front side of said other part and having a back face covering the opening leading to the slot, spring means urging said plate to the opening covering position, a detent carried by and projecting from the back face of said plate for extension into the slot through said opening, the detent being spaced longitudinally of the plate from the pivot, means forming a part of the tongue for engagement by the detent when the tongue is in the slot for locking the tongue in the slot, means for urging movement of the tongue outwardly in the slot following release of the tongue by the detent.

2. A safety belt buckle comprising two cooperating fully separable parts, the buckle having two outer end portions, a front and a back side, means at each of said outer end portions for attaching a belt end thereto, each of said parts embodying one of said end portions, said parts having opposing abutting end faces, a tongue projecting from the end face of one of said parts, the other of said parts having a slot opening through the end face thereof into which said tongue is received in fastening the buckle, the slot having four sides for snugly embracing corresponding sides of the tongue, a part of said slot opening through the front side of the said other part, a release plate pivoted to and forming a part of the front side of said other part and having a back face covering the opening leading to the slot, spring means urging said plate to the opening covering position, a detent carried by and projecting from the back face of said plate for extension into the slot through said opening, the detent being spaced longitudinally of the plate from the pivot, means forming a part of the tongue for engagement by the detent when the tongue is in the slot for locking the tongue in the slot, means actuated by the release plate following release of the tongue by the detent for urging movement outwardly in the slot.

3. A safety belt buckle comprising two cooperating fully separable parts, the buckle having two outer end portions, a front and a back side, means at each of said outer end portions for attaching a belt end thereto, each of said parts embodying one of said end portions, said parts having opposing abutting end faces, a tongue projecting from the end face of one of said parts, the other of said parts having a slot opening through the end face thereof into which said tongue is received in fastening the buckle, the slot having four sides for snugly embracing corresponding sides of the tongue, a part of said slot opening through the front side of the said other part, a release plate pivoted to and forming a part of the front side of said other part and having a back face covering the opening leading to the slot, spring means urging said plate to the opening covering position, a detent carried by and projecting from the back face of said plate for extension into the slot through said opening, the detent being spaced longitudinally of the plate from the pivot, means forming a part of the tongue for engagement by the detent when the tongue is in the slot for locking the tongue in the slot, said means forming a part of the tongue comprising the edge of an opening for receiving the detent, the detent on the side thereof nearest to the pivot having a longitudinal concave curvature for close sliding movement with an across the advancing edge of the opening in the engagement of the detent with and its disengagement from the tongue.

4. The invention according to claim 3, wherein the side of the detent opposite the concavely curved side is sloped to form a camming surface for engagement by the advancing end of the tongue to effect movement of the plate and detent and riding of the tongue under the detent.

5. A buckle comprising an elongate transversely divided two part structure, means at each of the outer ends of the structure for attaching a belt thereto, a first one of said parts embodying longitudinal side walls, a back plate connecting the walls at the inner ends thereof, a bar connecting the walls at said inner end and spaced from the back plate to form with the side walls and the back plate a slot opening toward the second one of said parts, said second part having an inner end face opposing the said inner ends of the walls and the plate and bar, a tongue element projecting from said end face of the second part and removably inserted in and snugly fitting the slot through the length of the slot, the tongue having a detent receiving opening, a detent plate having a front and a rear side and a hinge barrel across one end and lying between said walls at a position spaced from and across the end of the slot which is remote from the second part, means pivoting the barrel at its ends to the walls to turn on an axis extending longitudinally of the barrel, spring means urging turning of the detent plate to a closed position in which it lies between said walls and across said bar, a detent carried by the rear side of the detent plate for engagement in said receiving opening of the tongue between said bar and said barrel, and means for facilitating manual outward swinging of the detent plate for releasing the tongue.

6. The invention according to claim 5, the detent having a longitudinal concavely curved face on the side nearest to the barrel and concentric with said axis for close sliding engagement with the side of the tongue opening opposed thereto.

7. The invention according to claim 5, wherein said barrel is eccentric to the pivot axis and the peripheral surface forms a cam having a high part arranged to engage the end of the tongue after release of the tongue by the detent to apply a longitudinal thrust to the tongue in the direction of outward movement thereof.

8. The invention according to claim 5, wherein the detent is tapered and has an inclined longitudinal face on the side approached by the tongue when being inserted into the slot for engagement by the advancing end of the tongue whereby the detent is shifted to permit the tongue to ride therebeneath.

References Cited in the file of this patent

UNITED STATES PATENTS

| | | |
|---|---|---|
| 478,748 | Grosh | July 12, 1892 |
| 589,997 | Bagley | Sept. 14, 1897 |
| 618,895 | Munday | Feb. 7, 1899 |
| 827,352 | Estes | July 31, 1906 |
| 2,458,810 | Varney et al. | Jan. 11, 1949 |
| 2,710,999 | Davis | June 21, 1955 |

FOREIGN PATENTS

| | | |
|---|---|---|
| 326,459 | Italy | 1935 |
| 626,294 | France | May 9, 1927 |
| 663,850 | Germany | 1938 |
| 738,989 | Great Britain | 1955 |
| 791,479 | France | Sept. 30, 1935 |